United States Patent [19]

Chevereau

[11] Patent Number: 5,057,270
[45] Date of Patent: Oct. 15, 1991

[54] INSTRUMENTATION ARRANGEMENT FOR A PRESSURIZED WATER NUCLEAR REACTOR

[75] Inventor: Gérard Chevereau, Le Raincy, France

[73] Assignee: Framatome, Courbevoie, France

[21] Appl. No.: 398,609

[22] Filed: Aug. 25, 1989

[30] Foreign Application Priority Data

Aug. 25, 1988 [FR] France .................. 88 11224

[51] Int. Cl.⁵ .................................. G21C 17/10
[52] U.S. Cl. .................................. 376/254
[58] Field of Search ............ 376/254, 255, 245, 353, 376/203

[56] References Cited

U.S. PATENT DOCUMENTS

| | | | |
|---|---|---|---|
| 3,849,257 | 11/1974 | Bevilacqua | 376/353 |
| 4,696,786 | 9/1987 | Frizot et al. | 376/245 |
| 4,765,947 | 8/1988 | Babin et al. | 376/245 |
| 4,842,813 | 6/1989 | Desfontaines et al. | 376/353 |
| 4,983,351 | 1/1991 | Tower et al. | 376/254 |

FOREIGN PATENT DOCUMENTS

| | | |
|---|---|---|
| 0233424 | 8/1987 | European Pat. Off. . |
| 0238390 | 9/1987 | European Pat. Off. . |
| 2065512 | 7/1971 | France . |
| 2339939 | 8/1977 | France . |
| 2585870 | 2/1987 | France . |

Primary Examiner—Daniel D. Wasil
Attorney, Agent, or Firm—Pollock, Vande Sande & Priddy

[57] ABSTRACT

The instrumentation arrangement comprises a horizontal plate (31) arranged below the vessel (1) closure head (3) through which instrumentation columns (27) pass, carrying measurement conduits internally (26). The distribution plate (31) carries vertical guide tubes (38), into each of which a measurement conduit (26) is introduced. Each of the vertical guide tubes (38) is engaged into a tubular brace (17) of the upper internal equipment of the reactor, to ensure the guidance of the measurement conduit (26), from the instrumentation column (27) to an instrumentation guide tube (30) of a reactor core assembly (5). The distribution plate (31) is fastened in a removable manner to the plate (18) supporting the upper internal equipment of the reactor and may be raised relative to the upper internal equipment for withdrawing, as a unit, the measurement conduits (26) from the instrumentation tubes of the core assemblies, when the closure head (3) is removed.

8 Claims, 8 Drawing Sheets

INSTRUMENTATION ARRANGEMENT FOR A PRESSURIZED WATER NUCLEAR REACTOR

FIELD OF THE INVENTION

The invention relates to an instrumentation device for a pressurized water nuclear reactor and a process and a device for withdrawing and for installing this instrumentation device.

BACKGROUND OF THE INVENTION

Pressurized water nuclear reactors generally comprise a generally cylindrical vessel arranged with its axis vertical in service and closed at the top by a removable convex closure head. The reactor core, consisting of adjoining fuel assemblies of prismatic shape, is arranged inside the vessel, in which it is immersed in pressurized water for cooling the reactor when the latter is in service.

When the reactor is operating, measurements of neutron flux must be carried out inside the reactor core, in various places distributed along its cross-section and along its height.

The fuel assemblies comprise a skeleton structure including guide tubes arranged in the lengthwise direction of the assembly and placed in the core, in a vertical arrangement. Measurements of neutron flux are performed by means of measurement conduits which are introduced into the guide tubes of certain assemblies. The measurement conduits consist either of thimbles closed at one of their ends, which is introduced into the reactor core and in which thimbles movable probes can be moved, or of measurement rods in which neutron flux detectors are fixed in predetermined positions along the length of the rod.

In all cases, the measurement conduit comprises an end part which may be introduced into the core, and a second, opposed end part which enters a measurement room arranged in the vicinity of the reactor core. The measurement conduits are mounted slideably in the instrumentation tubes and may be withdrawn or installed merely by pulling or pushing on their ends, from within the measurement room.

The measurement conduits must, in fact, be withdrawn from the fuel assemblies of the core, for example when the reactor core is being recharged.

Moreover, the measurement conduits must enter the reactor vessel through leakproof passages through which guide tubes for the measurement conduits, of great length, are connected linking the vessel with the measurement room.

In an embodiment which is known and widely employed in pressurized water nuclear reactors, the passages for the measurement conduits consist of fittings provided on the convex bottom of the vessel. The instrumentation guide tubes connected to these fittings have a path in the shape of an arc of a circle of long radius of curvature, joining the bottom of the vessel to the measurement room.

The provision of fittings in the convex bottom of the vessel complicates the manufacture of this component and leads to difficulties insofar as the observance of safety standards is concerned.

Moreover, the structure of the reactor building must be designed to permit the passage of instrumentation guide tubes of great length along a trajectory which is a circular arc. As a result of this, the design and the construction of the reactor building are made more difficult.

Furthermore, access to the fittings passing through the bottom of the vessel is very difficult, and this complicates the operations of monitoring these fittings in order to ensure that the reactor operates in complete safety.

Lastly, the instrumentation guide tubes connected to the bottom of the vessel are always filled with the core coolant water, with the result that this water can enter the measurement room in the event of a defect in the sealing of the guide tube.

An instrumentation device has also been proposed and used, in which the measurement conduits pass through the vessel closure head in a leakproof manner. This avoids the disadvantages linked with the need to provide fittings in the bottom of the vessel and a complex reactor building structure to permit the passage of the instrumentation guide tubes towards the measurement room. However, in a layout of this kind, a part of the instrumentation device is carried directly by the closure head, and this complicates the operations of dismantling of the closure head, as well as the instrumentation handling and storage operations associated with the closure head during reactor stoppages.

An instrumentation device for the core of a nuclear reactor, in which the measurement conduits pass through the closure head is described in French Patent 2,065,512.

The instrumentation device comprises guide tubes capable of receiving neutron detectors in a fixed position or detection units which can move inside corresponding tubes. The guide tubes pass through the vessel closure head inside columns and are then distributed along the cross-section of the core by beam-shaped support arms arranged under the vessel closure head, which enable each of the detector tubes to be led towards a guide tube of a core fuel assembly intended to receive it.

In order to perform the recharging of the core, after the vessel has been depressurized, the devices permitting the leakproof passage of the instrumentation columns are disassembled, and then the vessel closure head is disassembled to permit access to the support arms and to the detector tubes.

The withdrawal of the support arms, each carrying a plurality of guide tubes independently of one another, is performed with the aid of a special tool, so as to preserve the shape and the distribution of these conduits. This requires numerous handling operations requiring special tools; the times involved are therefore very long and this increases the length of the period of reactor stoppage.

Furthermore, in order to avoid having a large number of support arms of complex shape, the number of assemblies into which a device for measuring neutron flux can be introduced is limited, at the expense of the accuracy of determination of the flux pattern in the core.

Nuclear reactors cooled by pressurized water comprise, arranged above the core, a structure which is called upper internal equipment, which consists chiefly of two horizontal plates connected by vertical braces, one of which, resting on the upper part of the fuel assemblies, forms the upper plate of the core. The other plate, called a support plate, arranged above the upper plate of the core at a certain distance ensured by the braces, is housed inside the vessel, in a recess in which it is fixed and locked in position when the closure head is closed.

The upper internal equipment also supports vertical columns forming guide tubes for the reactor control rods.

During a reactor stoppage for recharging and maintenance, the upper internal equipment of the reactor may be withdrawn and arranged on a storage stand in the reactor pool.

In the case of a core instrumentation device comprising guide tubes or measurement conduits passing through the closure head, the known arrangements of the prior art do not permit simple and rapid handling of the upper internal equipment during a reactor stoppage for recharging.

The advantages obtained in respect of the design and construction of the reactor, when the core instrumentation passes through the vessel closure head, are therefore accompanied by very considerable disadvantages insofar as the use and maintenance of the reactor are concerned.

For this reason, most nuclear reactors now in service incorporate instrumentation tubes which pass through the bottom of the vessel.

SUMMARY OF THE INVENTION

It is an object of the invention to propose an instrumentation device for the core of a pressurized water nuclear reactor comprising a vessel of overall cylindrical shape arranged vertically and closed by a removable closure head in its upper part, a core consisting of adjoining fuel assemblies placed vertically inside the vessel, a structure arranged above the core, called upper internal equipment, comprising an upper core plate resting on the assemblies and a support plate arranged above the core plate, which are horizontal and connected together by vertical braces and a set of tubular members for passing through the closure head, the instrumentation device comprising a plurality of measurement conduits in which neutron flux detectors can be installed, passing through the closure head and each entering a guide tube of a fuel assembly, this instrumentation device enabling both a satisfactory distribution of a large number of measurement conduits in the reactor core and a great ease of withdrawal and of installation of these measurement conduits in the reactor core.

To this end, the instrumentation device according to the invention additionally comprises, between the vessel closure head and the support plate, a plate for distributing and for guiding the measurement conduits, which plate is fastened to the support plate in a parallel arrangement, and above this plate, by means of vertical stanchions fastened on the support plate, to the upper part of which stanchions the distribution plate is attached in a removable manner, the distribution plate being pierced by passage openings for the vertical positioning members carried by the support plate, and receiving vertical instrumentation columns in positions corresponding to the positions of the tubular members passing through the closure head and means for hooking-up on its upper face and being integrally attached on its lower face directed towards the support plate to a plurality of vertical guide tubes in positions corresponding to those of tubular braces for the upper internal equipment in which the guide tubes can be engaged, each of these tubes receiving at least one measurement conduit originating from an instrumentation column in order to guide it through the upper internal equipment, from the distribution plate to the entry of an instrumentation tube of a fuel assembly.

The invention also relates to a process and to a device for withdrawing and for installing the instrumentation device when the reactor is being maintained.

BRIEF DESCRIPTION OF THE DRAWINGS

In order that the invention may be more clearly understood, a description will now be given, by way of example and with reference to the attached drawings, of an embodiment of an instrumentation device according to the invention, and of a device for handling this instrumentation assembly.

DESCRIPTION OF THE PREFERRED EMBODIMENT

Figure 1:
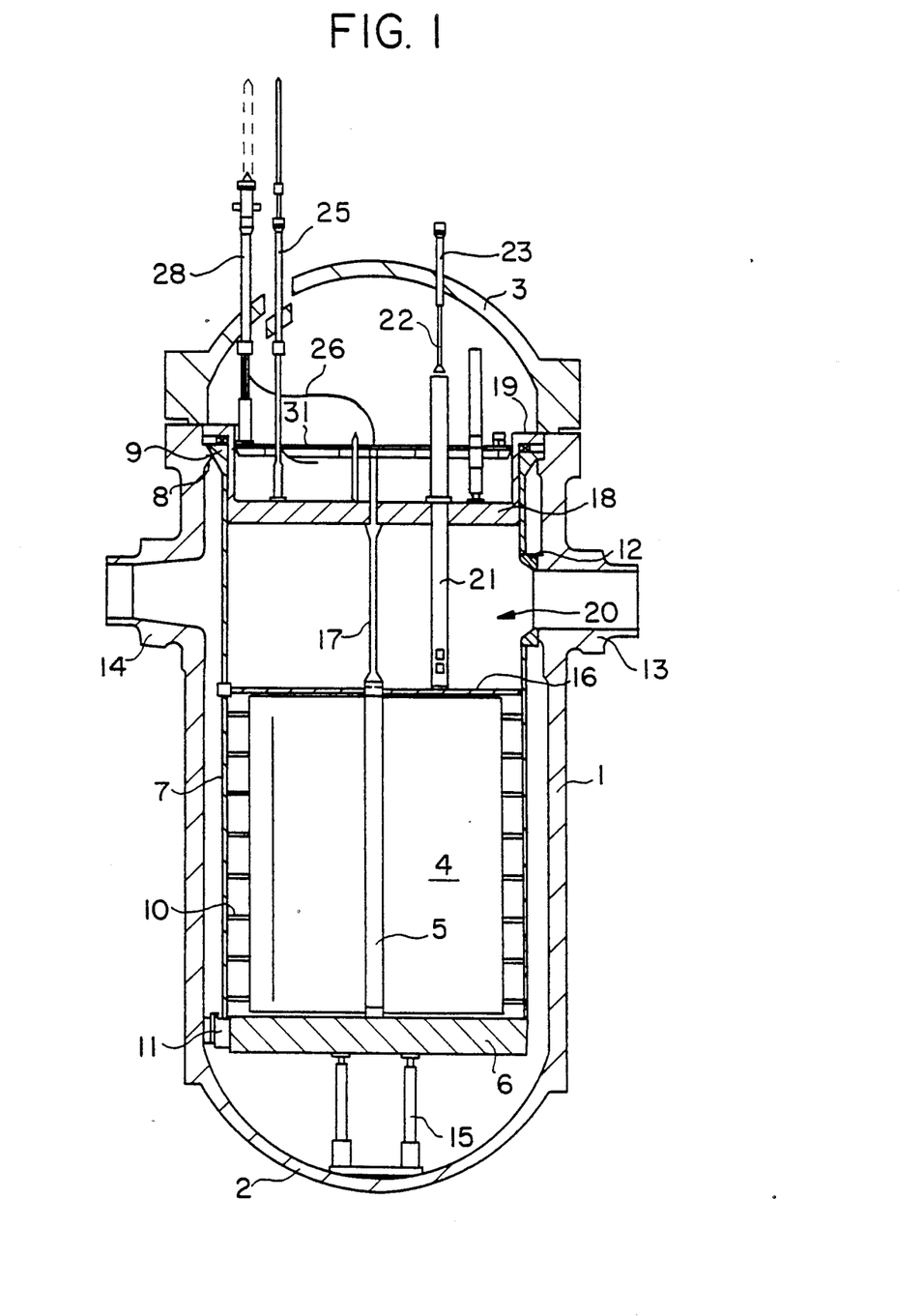
FIG. 1 is a view in cross-section through a vertical plane of a nuclear reactor vessel equipped with an instrumentation device according to the invention.

FIG. 1 shows the vessel 1 of a pressurized water nuclear reactor of overall cylindrical shape and with its lower part closed by a convex bottom 2.

The upper part of the vessel is closed by a removable closure head 3, also of convex shape.

The reactor core 4 consisting of fuel assemblies 5 of prismatic shape, arranged vertically and adjoining, rests on a lower core plate 6 fastened to the lower part of a cylindrical core shroud 7. The core shroud 7 rests, with its upper part 8 forming a flange, on a ledge bordering a recess 9 machined in the inner part of the vessel 1. The core screening 10, which, the shroud 7, forms the lower internal equipment of the nuclear reactor, is fastened to the inside of the core shroud 7. The lower internal equipment is held radially inside the vessel 1 by devices such as 11, in the region of the lower plate 6. These devices allow the lower internal equipment to be installed so that the outlet pipes 12 of the internal equipment extend the outlet pipes 13 of the vessel 1.

The vessel 1 also comprises inlet pipes 14 through which the pressurized water for cooling the reactor enters the vessel 1. After passing through the core 4 in the vertical direction, the primary coolant water leaves the vessel through the pipes 13.

Supporting devices 15 resting on the bottom 2 of the vessel permit the reactor core to be held in the event of an accidental descent of this core inside the vessel.

Placed in a horizontal position above the core 4 is an upper core plate 16 resting on the upper part of the fuel assemblies 5. This plate 16 is connected by means of vertical braces such as 17 to a support plate of great thickness 18, also placed in a horizontal arrangement and at a certain distance from the plate 16.

The plate 18 comprises an upper flange 19 fitting into the recess 9 of the vessel above the flange 8 of the core shroud 7. The vessel head closure 3 is fitted resting on the flange 19 to ensure the retention and the locking of the support plate 9 and of the members attached to this support plate.

The plate 18 and all the members which are connected to it form the upper internal equipment 20 of the reactor, arranged above the core 4.

In addition to the upper core plate 16 and the bracing 17, the upper internal equipment comprises guide tubes 21 for the reactor control rods 22 which pass through the closure head 3 by means of adaptor tubes 23 and thermocouple entry tubes 24 passing through the vessel closure head inside adaptor tubes 25.

The support plate 18 also ensures the fastening and the positioning of the instrumentation device according to the invention, which will be described generally with reference to FIGS. 1 and 2.

The instrumentation device comprises a set of measurement conduits such as 26 which pass through the vessel closure head 3 by means of instrumentation columns 27 fitted in a leakproof manner in adaptors 28 passing through the vessel closure head 3.

Each of the measurement conduits 26, which may consist either of a thimble in which a movable probe travels, or of a measurement rod in which probes are placed in a fixed position, is directed towards a tubular brace 17 of the upper internal equipment, which guides the conduit 26 towards a guide tube 30 of a core assembly 5.

The distribution of the conduits 26 originating from an instrumentation column 27 over the core section, so as to direct these conduits 26 towards the inlet of the corresponding tubular braces 17 of the upper internal equipment, is ensured by a distribution plate 31 of circular shape whose diameter is very slightly smaller than the diameter of the plate 18 supporting the upper internal equipment 20.

Figure 5:
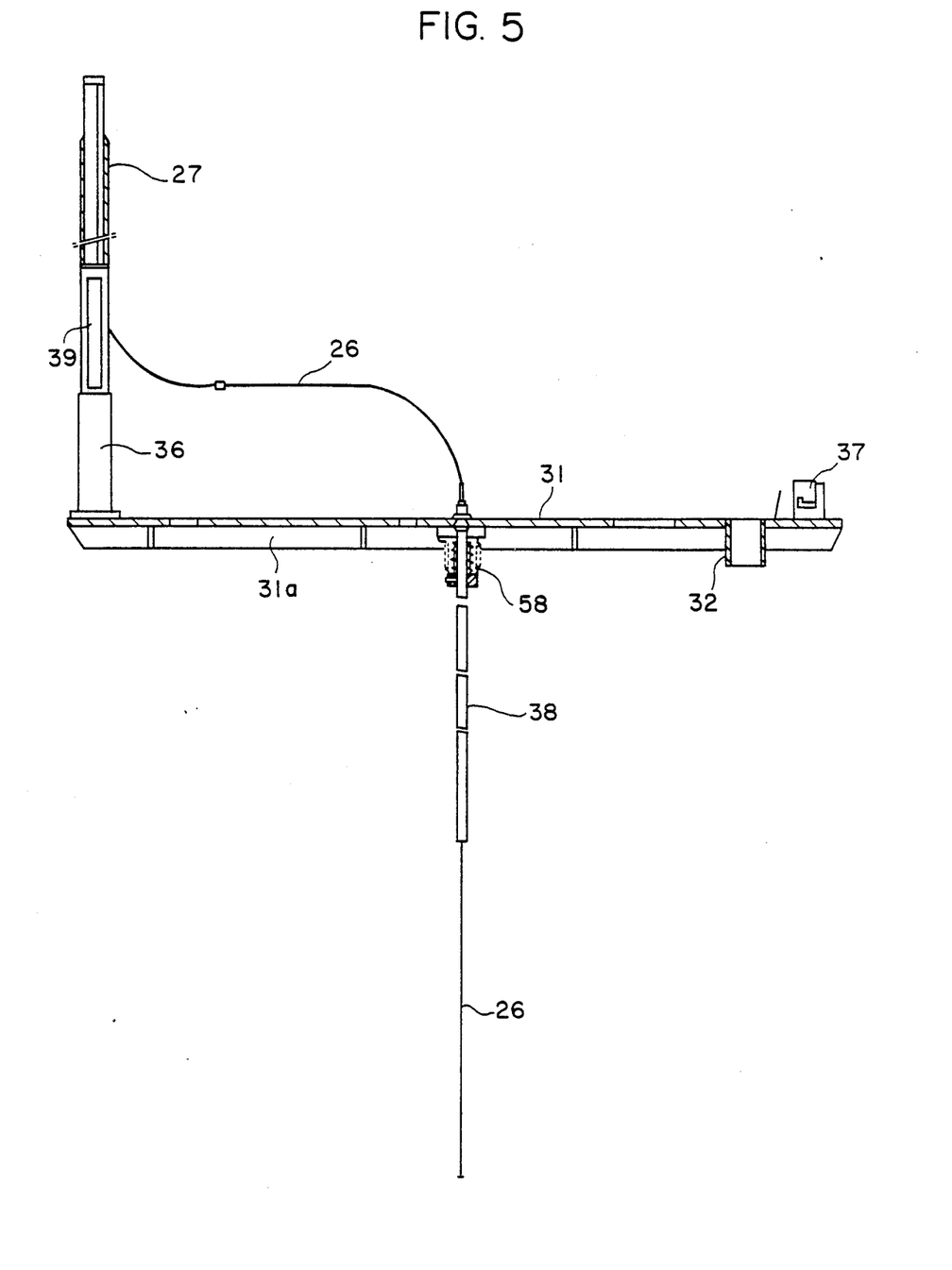
FIG. 5 is a sectional elevation view of the assembly for distributing and guiding the measurement conduits of the instrumentation device according to the invention.

The distribution plate 31, which can also be seen in FIG. 5, consists of a steel plate reinforced with intersecting ribs 31a. The distribution plate 31 is pierced by a lattice of openings allowing the guide tubes 21 of the control rods 22 and of the thermocouple columns 24, fastened to the upper internal equipment, to pass through.

Figure 2:
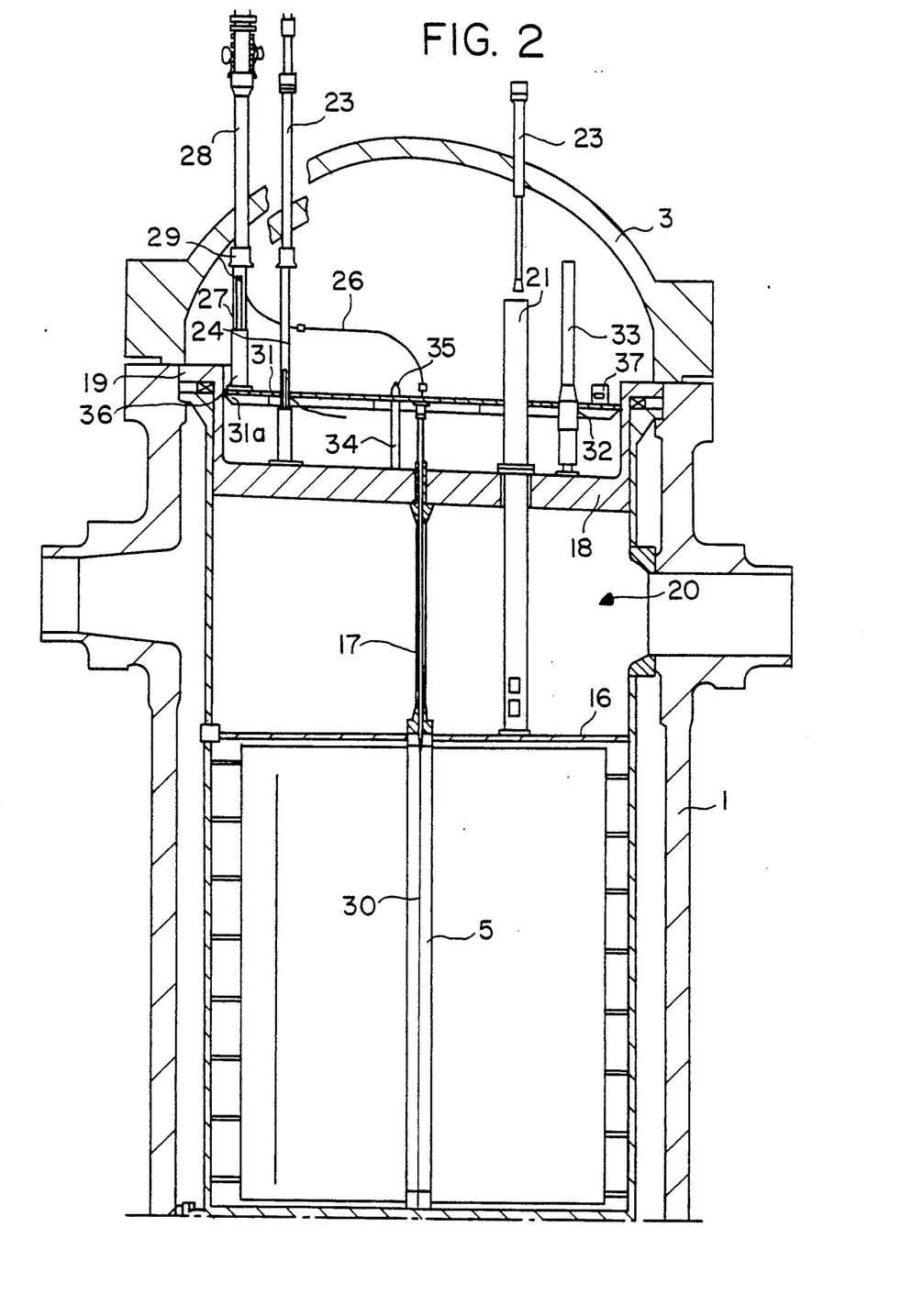
FIG. 2 is a larger scale view of the upper part of the vessel shown in FIG. 1, comprising the instrumentation device.

The plate 31 additionally comprises openings in which guide bushes 32 are fixed, these being engaged onto the vertical guiding and positioning columns 33 fastened to the support plate 18 when the distribution plate 31 is in position in the vessel, as shown in FIGS. 1 and 2.

Upon being installed in the vessel, the plate 31, guided by the columns 33, comes to rest on the upper part of stanchions 34 incorportating a bearing shoulder and a threaded part passing through the plate 31 at an opening whose diameter is smaller than the diameter of the bearing shoulder. A nut 35 enables the plate 31 to be fastened to the stanchion 34. The nuts 35 for fastening the plate 31 are self-lockable and ensure a rigid fastening of the plate 31.

On its upper surface, the plate 31 carries vertical bushes 36 serving as a footing for the instrumentation columns 27 through which pass the conduits 26.

On its upper surface the distribution plate 31 also carries hooking up means 37, which will be described later.

Lastly, as can be seen in FIG. 5, on its lower face, directed towards the support plate 18, the plate 31 carries vertical guide tubes or rods such as 38, in each of which a measurement conduit 26 is engaged. When the instrumentation device is installed in the vessel, as shown in FIGS. 1 and 2, each of the guide tubes 38 is introduced into a tubular brace 17 of the upper internal equipment.

Figure 3:
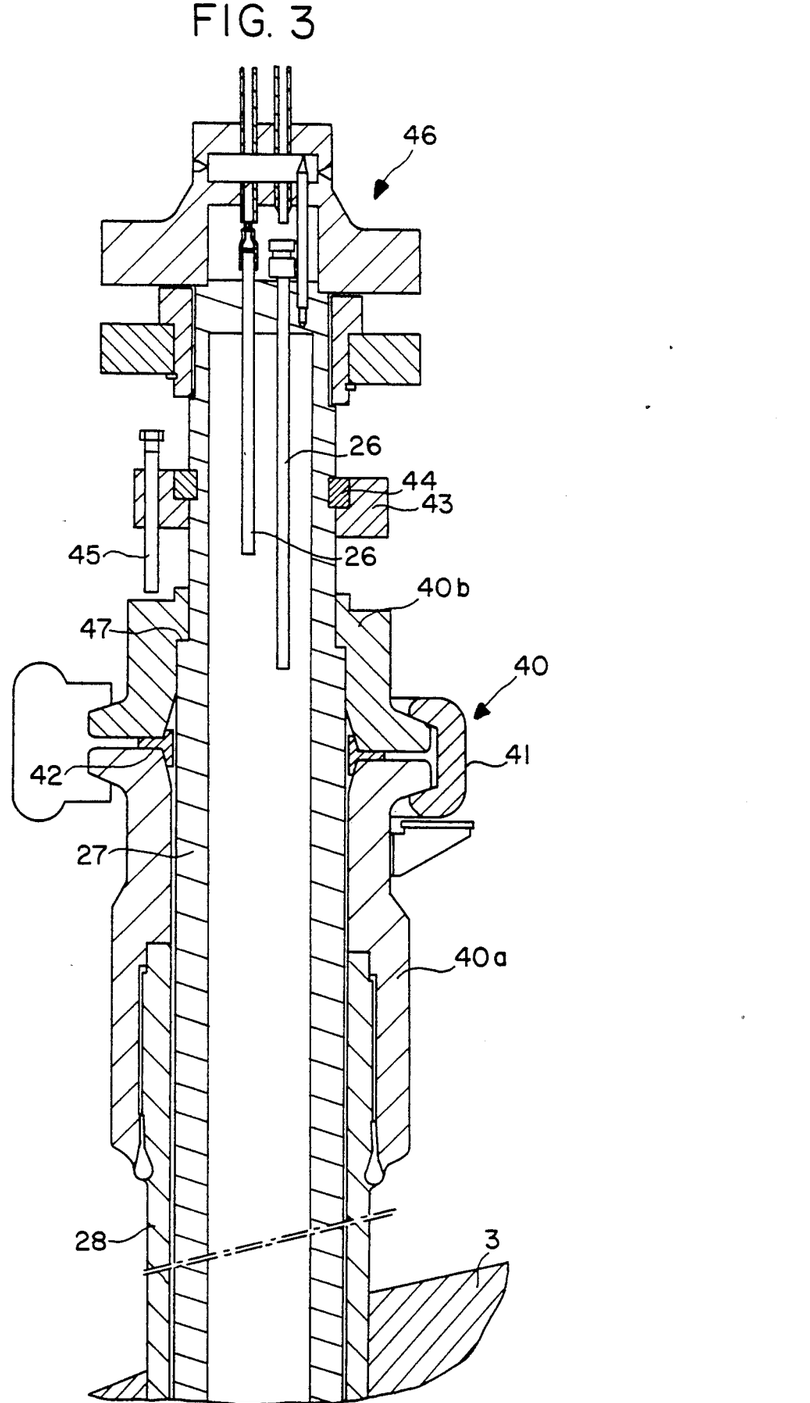
FIG. 3 is a view in cross-section through a vertical plane of the upper part of an instrumentation column, above the vessel closure head.

Reference will now be made to FIG. 3 to describe in greater detail an instrumentation column 27 and the leakproof fitting of this instrumentation column 27 inside the corresponding adaptor 28 passing through the closure head 3.

As can be seen in FIGS. 1 and 2, the lower part of each of the instrumentation columns 27 is fitted into the corresponding footing 36, forming an integral part of the upper face of the distribution plate 31. Above the footing 36, the instrumentation column 27 has openings 39 allowing the measurement conduits 26 associated with this instrumentation column 27 to pass through.

In a preferred embodiment, the instrumentation device of the pressurized water nuclear reactor core comprises six instrumentation columns such as 27 passing through the corresponding adaptors 28 passing through the vessel closure head. Two of these columns allow measurement rods containing probes in a fixed position to pass through, and the other four columns allow thimbles containing movable probes to pass through.

FIG. 3 shows the upper part of an adaptor tube 28, above the vessel closure head 3, providing the leakproof exit of an instrumentation column 27 whose lower part is engaged in a footing 36 forming an integral part of the distribution plate 31.

The instrumentation column 27, of tubular shape, allows a set of measurement conduits 26, which are arranged in the internal space of the column 27, to pass through the closure head into the interior of the vessel.

The column 27 is attached in a leakproof manner to the inside of the extender 28, by means of a sealing assembly 40 comprising a lower sleeve 40a and an upper sleeve 40b. Both sleeves carry conical parts onto which bear the inner faces of a ring 41, ensuring the connection of the sleeves 40a and 40b.

An internal seal 42 made of metallic material provides the sealing of the two sleeves 40a and 40b.

A ring 43 is fastened by means of a keying member 44 onto a part of the tubular column 27 projecting above the sleeve 40b. Screws 45 engaged in the ring 43 bear with their lower part on the upper part of the sleeve 40b so as to ensure slight lifting of the tubular column 27 whose lower part is merely engaged in the footing 36. This lifting gives rise to a leakproof contact by virtue of a seal of a shoulder 47 machined on the outer surface of the tubular column 27 with a corresponding shoulder of the sleeve 40b.

The upper part of the tubular column 27 is closed by an end plate pierced with passage openings for the measurement conduits 26.

A connector 46 attached to the upper part of the column 27 allows the ends of the measurement conduits passing through the upper end plate of the tubular column 27 to be coupled to the lengths of these measurement conduits responsible for the connection to the instrumentation room.

In a preferred embodiment, 17 measurement conduits are arranged in each of the tubular instrumentation columns, reemerging at the base of the instrumentation column through the openings 39 and being distributed by the distribution plate 31 into the instrumentation tubes of the core assemblies.

FIG. 2 shows the path of an individual measurement conduit between the instrumentation column 27 and the upper face of the distribution plate.

Figure 4:
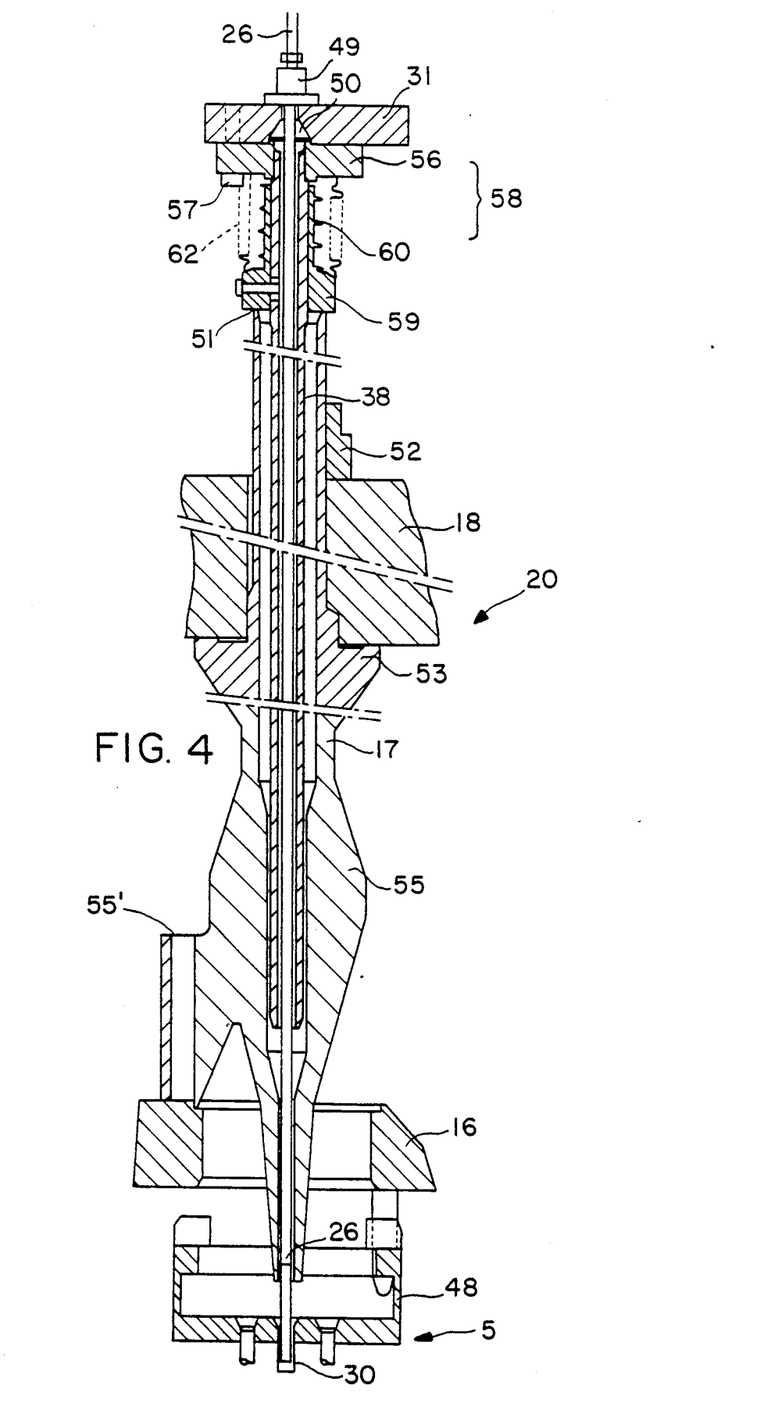
FIG. 4 is a view in cross-section through a vertical plane of a passage of a measurement conduit through the internal equipment of the reactor.

FIG. 4 shows the part of a measurement conduit 26 passing through the distribution plate 31 and the internal equipment 20 in a vertical direction, in order to arrive at an instrumentation guide tube 30 of a fuel assembly 5 whose upper terminal 48 has been shown in FIG. 4.

The measurement conduit 26 is fastened to the upper face of the distribution plate 31 by means of a leakproof coupling 49 arranged in prolongation of an opening 50 passing through the plate 31.

The conduit 26 passes through the distribution plate inside the opening 50 and then through the upper internal equipment in the vertical direction, inside the guide tube 38, itself arranged inside a tubular brace 17 passing through the plates 18 and 16 and fastened to these plates at the passage openings.

The column 17 comprises a widening 53 bearing on the lower face of the support face 18 and a threaded part onto which a clamping nut 52 is engaged, allowing the brace 17 to be fastened to the plate 18.

It will be noted, however, that certain braces do not comprise a widening 53 or a nut 52, in order to permit a possibility of axial expansion of the brace in question.

The brace 17 also comprises a shaped footing 55 which is engaged in an opening in the upper core plate 16 arranged in vertical alignment with the fuel assembly 5. This shaped footing comprises radial widenings pierced with screw holes 55' situated in the extension of fastening holes machined in the brace 17, for fastening the lower part of the column 51 onto the upper plate 16.

As indicated above, on its lower surface the distribution plate 31 carries, extending the passage opening 50 for the measurement conduit 26 passing through the plate 31, a vertical guide tube 38 whose diameter is smaller than the internal diameter of the tubular brace 17. The guide tube 38 is fastened in its upper part under the distribution plate 31 by means of a small fastening plate 56 and screw 57.

The small fastening plate 56 supports a sealing assembly 58 surrounding the upper end of the guide tube 38. This sealing assembly 58 comprises a valve 59 mounted slideably around the upper end part of the guide tube 38, returned to a low position by a helical spring 60 and connected to the upper face of the small plate 56 by a bellows 62.

The valve 59 comes into contact with the upper end 51 of the tubular brace 17, which it provides with a leakproof closure, when the guide tube 38 is engaged inside the tubular brace 17, as shown in FIG. 4.

This leakproof closure of the end 51 of the tubular brace 17 prevents undesired circulation of the reactor coolant water along the guide tube 38 when the reactor is in operation. Undesired circulation of this kind would, in fact, be liable to give rise to vibrations, resulting in rapid wear of the measurement conduits 26.

An alternative form of the invention consists in using a brace 17 whose internal diameter is sufficiently large to receive a number of guide tubes 38 and whose footing 55 is provided with guides so as to introduce a number of probes or detectors into the instrumentation tube and the guide tubes of the same single assembly 5.

FIG. 5 shows the part of the instrumentation device capable of being moved vertically inside the upper internal equipment, by means of the tool which will be described hereinbelow.

This vertical movement of the illustrated part of the instrumentation device may be performed over a total height of the order of four meters, which enables the measurement conduits 26 to be withdrawn completely from the instrumentation tubes 30 of the fuel assemblies.

This operation is performed during a reactor stoppage, after cooling and depressurizing of the primary circuit and of the reactor vessel and after disassembly and lifting of the vessel closure head 3.

The upper part of the distribution plate 31 is then accessible under a sufficient head of water in the nuclear reactor pool to provide the operators with biological protection.

The fastening of the distribution plate 31 to the support plate 18 is generally produced by means of six stanchions 34 associated with six removable fastening devices 35. These removable fastening devices are dismantled in sequence to separate the distribution plate 31 from the support plate 19.

The removable fastening devices 35 placed at the upper end of the stanchions 34 for fastening the distribution plate 31 are dismantled by using a key of great length comprising a rod for unlocking nuts in its central part.

The distribution plate 31 and the components which are connected to this plate, as shown in FIG. 5, can then be moved in the vertical direction and upwards relative to the upper internal equipment, this plate being merely engaged onto vertical components such as the positioning members 33 and the guide bushes 32 integrally attached to the plate 31.

Before the disassembly of the closure head is carried out, the devices for sealing the adaptors, such as adaptors 28, are dismantled, and this makes it possible to separate the instrumentation columns 27 from these adaptors 28 and from the closure head 3.

Figure 6:
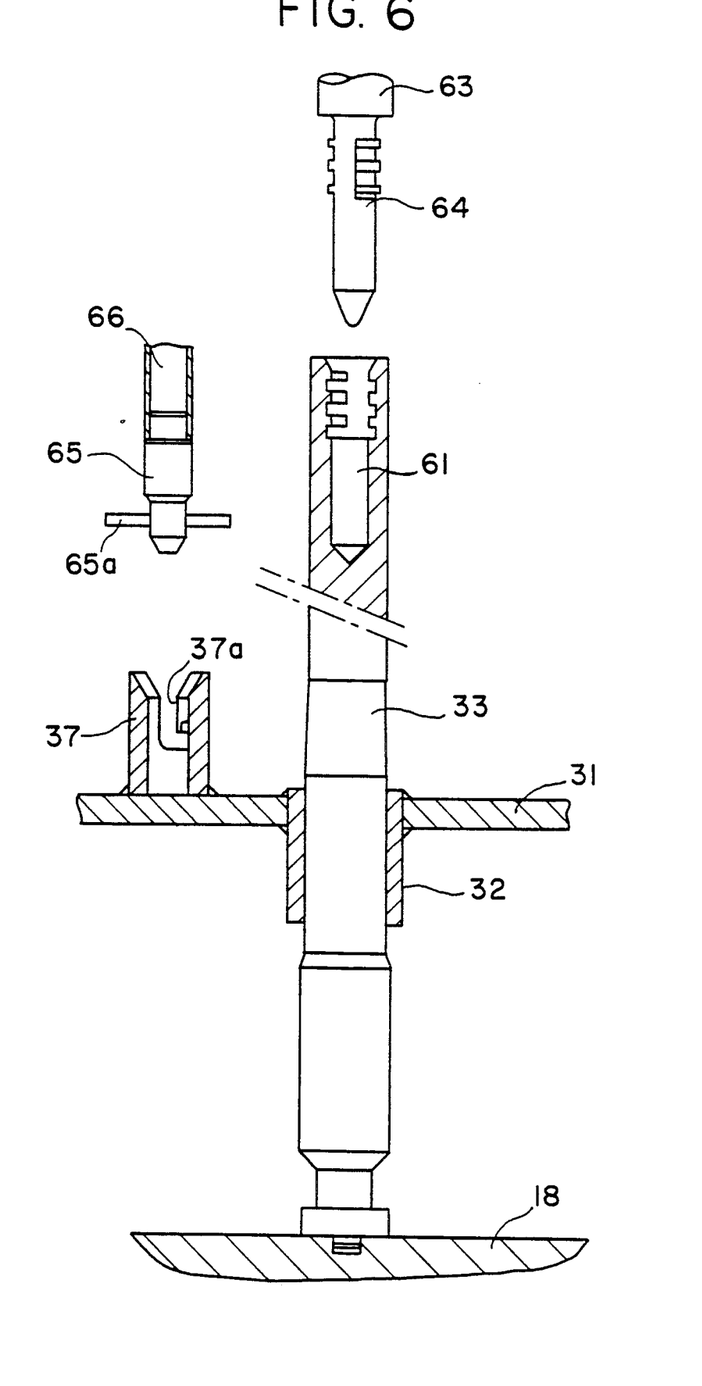
FIG. 6 is a sectional elevation view of the means for positioning and for hooking-up the distribution plate of the instrumentation device according to the invention.

FIG. 6 shows a guiding and positioning member fastened in vertical position to the support plate 18 and engaged in a bush 32 integrally fastened to the distribution plate 31 at a passage opening provided in a corresponding position.

In its upper part, the guide member 33 has an axial bore 61, machined to form a number of partial successive grooves along its periphery.

This bore makes it possible to assemble a guide column 63 onto the upper end of the guide member 33, by means of a coupling consisting of a spindle 64 comprising partial peripheral ribs whose arrangement and shape correspond to the partial grooves in the bore 61.

The assembly of the column 63 may be performed by introducing the spindle 64 into the bore 61 in a certain orientation, and then rotating the column 63 around its common axis with the axis of the bore 61 and of the member 33 by a fraction of a turn. The column 63, whose outer diameter is identical with the outer diameter of the member 33, is then fastened to the end of this member 33 and extends it, to provide continuity of guidance for bushes 32 and plate 31.

FIG. 6 also shows a hooking up means 37 enabling the distribution plate 31 to be raised in the vertical direction.

The device 37 consists of a tubular component comprising two profiled slots 37a in its side wall.

These slots 37a allow the lower hooking-up end 65 of a lifting rod 66 to be connected from a distance to the bush 37 and to the plate 31.

To this end, the transverse pin 65a of the part 65 is introduced into the slots 37a using a vertical movement and then the rod 66 is rotated around its axis to hook-up of the part 65, 65a of this rod onto the bush 37, by means of a bayonet-type system.

The guide columns 63 and the lifting rods 66 are associated with devices for lifting and handling the upper internal equipment of the reactor and enable the instrumentation device to be lifted and the measurement conduits to be withdrawn from the guide tubes of the assemblies before the upper internal equipment is withdrawn from the reactor vessel.

Figure 7:
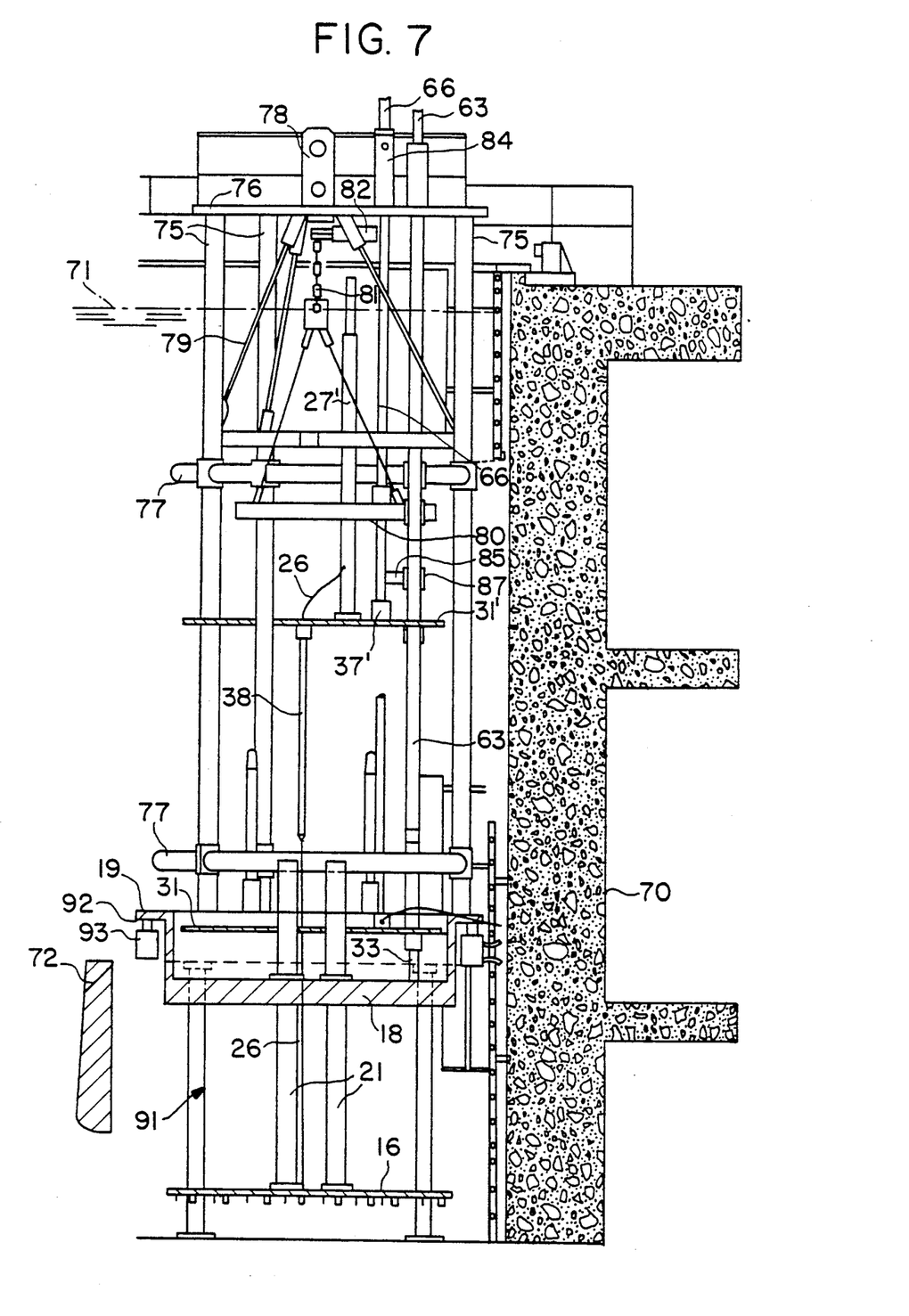
FIG. 7 is an elevation view of the device for handling the internal equipment and of the instrumentation device of a nuclear reactor.
Figure 8:
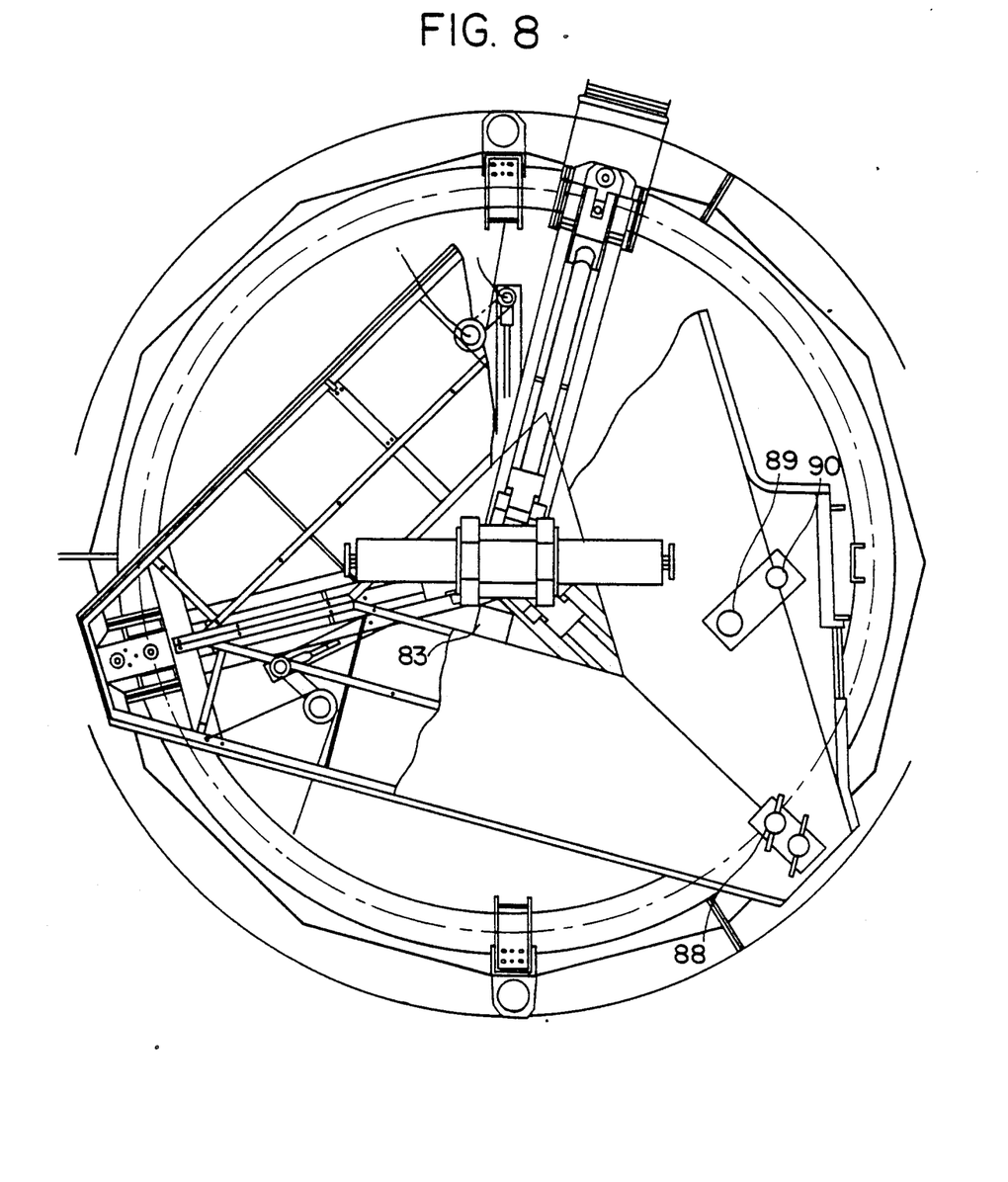
FIG. 8 is a top view of the handling device of FIG. 7.

FIGS. 7 and 8 show the device for lifting and handling the upper internal equipment of the reactor, fitted with the necessary means for lifting and handling the instrumentation device according to the invention.

In FIG. 7, the device for handling the upper internal equipment has been shown in the position which it occupies inside the reactor pool, at the time when the upper internal equipment of the reactor is being deposited onto its storage stand.

This figure shows the wall 70 of the reactor pool which is filled with water up to the level 71 during the stage illustrated, corresponding to the deposition of the upper internal equipment onto the storage stand which is separated from the reactor vessel by a vertical wall 72.

The device for handling the upper internal equipment usually consists of a structure comprising three vertical columns 75 carrying a platform in their upper part and connected to two bracing structures 77 at a certain distance in the vertical direction.

In its lower part, each of the columns 75 comprises a device (not shown) for connecting to the plate 18 supporting the upper internal equipment.

As can be seen in FIGS. 7 and 8, a lifting ring 78 onto which the hook of the powerhouse gantry can be engaged is arranged above the platform 76 and attached to the columns 75 by means of a sling bar 79.

In FIG. 7, the instrumentation distribution plate 31 is shown in a first position relative to the upper internal equipment corresponding to its service position shown in FIGS. 1 and 2, and in a second position 31' which corresponds to a high position inside the upper internal equipment of the reactor, of the movable assembly of the instrumentation device such as shown in FIG. 5.

The vertical distance between these two positions 31 and 31' of the distribution plate corresponds substantially to the height of the reactor core, i.e., in most cases, to a distance of about four meters.

The means for lifting and guiding the distribution plate 31 which are shown in FIG. 6 are associated with devices for lifting the upper internal equipment, shown in FIG. 7.

The three lifting rods 66, each of which can be connected to a device 37 for hooking up the distribution plate 31, are connected to a sling bar 80, itself connected to the chain 81 of a hoist 82 attached to the lifting ring 78 under the platform 76. The hoist 82 comprises, in particular, a reduction gear drive 83 which can be seen in FIG. 8, which allows the sling bar 80 and the rods 66 which are coupled to this sling bar to be raised or lowered over a height of approximately four meters, corresponding to the height of movement of the distribution plate 31.

The rods 66 are guided by means of sleeves 84 at a level above that of the platform 76.

When the plate 31 is in its high position 31', the upper part of the rods 66 projects over a height of four meters relative to the upper part of the sleeves 84.

The columns 63 for guiding the distribution plate 31, on which the sleeves 32 slide, can be attached, in their lower part, to the guiding and positioning columns 33, as has been described with reference to FIG. 6. The guide columns 63 are held transversely by the bracing members 77 of the assembly for lifting the upper internal equipment, and at the same time are responsible for guiding the plate 31 by means of the bushes 32 and the lifting rods by means of arms 85, each carrying a guide sleeve 87 at its end.

As can be seen in FIG. 8, means for actuating the means for hooking up and for guiding the device shown in FIG. 7 are accessible from the upper platform 76.

These devices, consisting of manipulating handles, comprise, in particular, the devices 88 for locking the means for connecting the columns 75 and the plate 18 supporting the upper internal equipment, the device 89 for maneuvering the mechanisms 64 for locking the guide columns 63 onto the positioning means 33, and devices 90 for locking the lifting rods 66 onto the hooking-up means 37 of the plate 31.

A description will now be given, with reference to all the figures, of an operation of handling the instrumentation device according to the invention and of the upper internal equipment of the reactor in order to remove it from the reactor vessel to the storage stand, shown in FIG. 7.

The nuclear reactor is stopped cold and the sealed passage devices on the closure head are uncoupled.

Insofar as the instrumentation columns 27 are concerned, the devices 46 for coupling the measurement conduits 26 are dismantled and the screws 45 for keeping the columns sealed are slackened off, and then the coupling ring 41 is dismantled.

After the members passing through the closure head has been separated, this closure head is lifted up in order to gain access from above to the instrumentation device attached to the plate supporting the upper internal equipment.

The removable coupling devices 35 for the distribution plate 31 and the support plate 18 are dismantled, and the device for handling the upper internal equipment, shown in FIGS. 7 and 8, is brought above the reactor vessel and then placed in a lifting position on the upper internal equipment by conventional guiding members.

The locking devices 88 are actuated from the platform 76 to permit connection of the columns 75 and of the upper flange 19 of the support plate 18.

The devices 89 are similarly actuated to permit the coupling of the guide columns 63 and the devices 33 passing through the distribution plate 31.

Similarly, the devices 90 are actuated to produce the connection between the lifting rods 66 and the means 37 for hooking up the distribution plate 31.

The hoist 82 is operated so as to lift the distribution plate 31 over a height of approximately four meters, this plate moving from its position 31 to its position 31', shown in FIG. 7.

The movement of the plate is ensured by the sling bar 80 and by means of the rods 66, while the columns 66 make it possible to guide the vertical movement of the plate 31 and of the lifting rods 66.

The vertical movement of the movable assembly of the instrumentation device shown in FIG. 5 makes it possible to withdraw the measurement conduits 26 completely from the corresponding guide tubes 31 of the assemblies 5.

As can be seen in FIG. 7, in the high position 31' of the distribution plate 31, the lower end of the measurement conduits 26, which are connected to the plate 31 and engaged in the guide tubes 38, is at the level of the upper core plate 16, i.e., just above the upper terminals of the fuel assemblies.

Complete separation of the instrumentation device according to the invention from the reactor core has then been achieved.

The measurement conduits 26 remain engaged in the tubular columns for guiding the upper internal equipment, and are thus protected.

The upper internal equipment and the instrumentation device can be transported in a high position 31' from the reactor vessel to the upper internal equipment storage stand 91, where the outer rim 92 of the upper flange 19 of the plate 18 supporting the upper internal equipment comes to rest on the supports 93.

It is then possible to carry out both recharging of the reactor core and maintenance and repair of the upper internal equipment and/or of the instrumentation device suspended above the upper internal equipment.

It should be noted that in order to be moved from the reactor vessel to the upper internal equipment storage stand, this upper internal equipment and the instrumentation device according to the invention must be lifted as high as possible when crossing over the wall 72. The device is so designed that, at this highest point of their movement, the equipment and the instrumentation device are still immersed in the water in the reactor pool.

The high positioning and the transport of the instrumentation device with the upper internal equipment may be carried out without having to dismantle the instrumentation columns 27 which remain engaged in the fastening bushes 36 integrally attached to the upper face of the distribution plate 31.

When the upper internal equipment is on its storage stand, as shown in FIG. 7, the movable part of the instrumentation device according to the invention being in a high position, the upper part of the instrumentation columns 27, in their high position 27', remains at a level below the upper level of the pool.

The instrumentation device according to the invention has the advantage of allowing the instrumentation conduits to pass through the vessel closure head while avoiding the difficulties encountered with prior art devices, insofar as the dismantling and the handling of the instrumentation device and the handling of the upper internal equipment of the reactor between the vessel and the stand for storing this internal equipment in the reactor pool are concerned.

When the upper internal equipment is reinstalled in the vessel, by a maneuver which is the reverse of that described above, the instrumentation device is in a high position relative to the upper internal equipment, and the measurement conduits are protected by the tubular columns of this internal equipment. When the upper internal equipment is reinstalled in the vessel, the tubular guide columns are in alignment with the guide tubes of the fuel assemblies, with the result that the measurement conduits 26 engage without difficulty into the guide tubes of the instrumented assemblies during the downward movement of the instrumentation device, which is produced by means of the rods 66.

All these manoeuvres are produced by virtue of a simple device integrated with the device for handling the upper internal equipment.

All dismantling and handling the instrumentation device and the upper internal equipment may be performed very easily and in a very short time.

This avoids lengthening the reactor stoppage periods for discharging and recharging the fuel assemblies.

Furthermore, the instrumentation device according to the invention makes it possible to avoid the presence of fittings at the bottom of the vessel and thus considerably increases the safety of the nuclear reactor. Furthermore, the structure of the reactor building can be simplified, owing to the fact that no passage for instrumentation guide tubes is arranged between the bottom of the vessel and the reactor instrumentation room. Furthermore, in the event of piercing of a measuring conduit such as a thimble during the maintenance operations, the reactor coolant fluid is incapable of running into the instrumentation room, since the reactor vessel is depressurized.

Lastly, the geometry of the distribution plate makes it possible to combine measurement conduits with a very large number of fuel assemblies, and this makes it possible to improve the knowledge of the distribution of the neutron flux in the core.

The device according to the invention may be produced in a manner which is slightly different from that described, insofar as its means for guiding, for hooking up or for moving are concerned.

The rods for lifting the distribution plate could be combined with jacks instead of a sling bar suspended from a hoist, in order to be moved vertically.

The sealing means associated with the distribution plate and with the instrumentation columns may be of any type.

The invention can be applied to any pressurized water nuclear reactor comprising upper internal equipment which has a support plate on which the distribution plate for the instrumentation device can be placed.

Finally, the means for lifting the instrumentation device which are associated with the device for handling the upper internal equipment could be employed to perform the lifting and the handling of devices associated with a nuclear reactor and other than the instrumentation devices.

What is claimed is:

1. Instrumentation device for the core of a pressurized water nuclear reactor comprising a generally cylindrical vessel (1) arranged vertically and having an upper part closed by a closure head (3), a core (4) consisting of adjoining fuel assemblies (5) placed vertically inside the reactor vessel (1), upper internal equipment (20) arranged above the core and comprising an upper core plate (16) resting on the fuel assemblies (5) and a support plate (18) arranged above the core plate (16), the upper core plate and support plate being horizontal and connected together by vertical braces (17) and a set of tubular members (23, 25, 28) for passing through the closure head (3), the instrumentation device comprising a plurality of measurement conduits (26) containing neutron flux detectors, each of the neutron flux detectors passing through the closure head and entering an instrumentation tube (30) of a fuel assembly (5), the instrumentation device further comprising, between the vessel closure head (3) and the support plate (18), a plate for distributing and guiding (31) the measurement conduits (26), said plate being fastened onto the support plate (18) in a parallel arrangement and above the support plate (18) by vertical stanchions (34) fastened onto the support plate (18), to the upper part of which stanchions the distribution plate (31) is removably attached, the distribution plate (31) having passage openings for positioning members (33) carried by the support plate (18) and receiving vertical instrumentation columns (27) in positions corresponding to the positions of the tubular members (28) passing through the closure head (3) and means (37) for hooking up on its upper face and being integrally attached on its lower face directed towards the support plate (18) to a plurality of vertical guide tubes (38) in positions corresponding to positions of said tubular braces (17) for the upper internal equipment (20) in which the guide tubes (38) are engaged, each of the guide tubes (38) receiving at least one measurement conduit (26) originating from an instrumentation column (27) in order to guide it through the upper internal equipment (20) from the distribution plate (31) to the entry of an instrumentation tube (30) of a fuel assembly (5).

2. Instrumentation device according to claim 1, wherein each of the instrumentation columns (27) comprises an axial passage for a plurality of measurement conduits (26) and at least one opening (39) communicating with the axial passage, above the distribution plate (31), to permit the measurement conduits (26) to pass through between the instrumentation column and a passage region of the distribution plate (31).

3. Instrumentation device according to claim 2, wherein each of the instrumentation columns (27) is engaged in a vertical bush (36) integrally attached to the upper face of the distribution plate (31).

4. Instrumentation device according to claim 1, wherein the distribution plate (31) carries a leakproof passage device (49) for the measurement conduit (26) in each of the passage regions of a measurement conduit (26).

5. Instrumentation device according to claim 1, wherein each of the instrumentation columns (27) is connected, in its upper part, to a demountable device (46) for joining the lengths of the measurement conduits (26) extending through the instrumentation columns and lengths of these measurement conduits connected to an instrument room adjacent to the reactor core.

6. Instrumentation device according to claim 1, wherein each of the instrumentation columns (27) is connected to the distribution plate (31) with free vertical movement and comprises a device (43, 44, 45) allowing it to be moved vertically, from outside the closure head, between a high position of leakproof coupling to the corresponding adaptor tube (28) and a low position without leakproof coupling to the adaptor tube (28).

7. Instrumentation device according to claim 1, comprising a valve (59), around each of the vertical guide tubes (38), in its upper part connected to the lower face of the distribution plate (31), said valve being attached under the distribution plate (31) with free vertical movement, and for leakproof closure of the end (51) of the tubular brace (17) in which the guide tube (38) is engaged, in order to prevent circulation of the reactor cooling fluid around the guide tube (38) while the nuclear reactor is in operation.

8. Instrumentation device according to claim 1, wherein the means (37) for hooking up the distribution plate (31) consist of cylindrical bushes (37) having in their side wall at least one opening (37a) for hooking up.

* * * * *